Aug. 23, 1955 W. A. LINDSTROM ET AL 2,715,958
CHAIN CONVEYOR FOR HANDLING PIERCED BILLETS AND MANDREL BARS
Filed Feb. 18, 1954 2 Sheets-Sheet 2
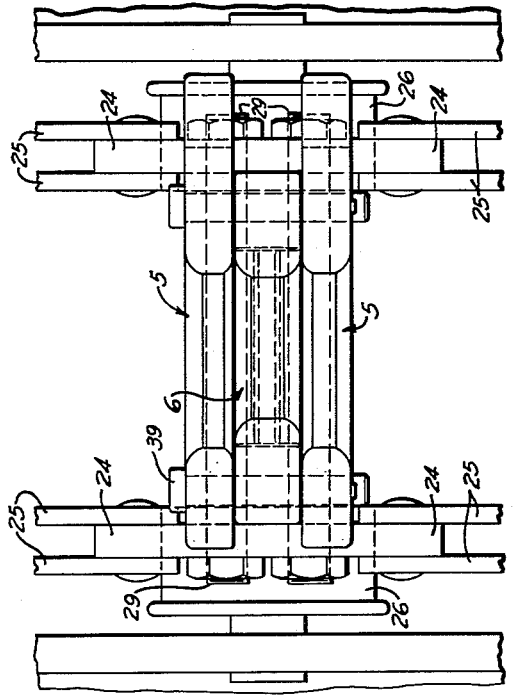
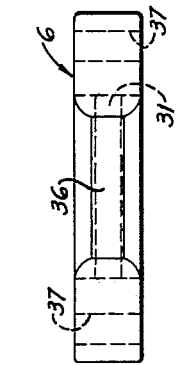
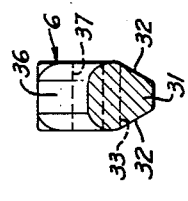
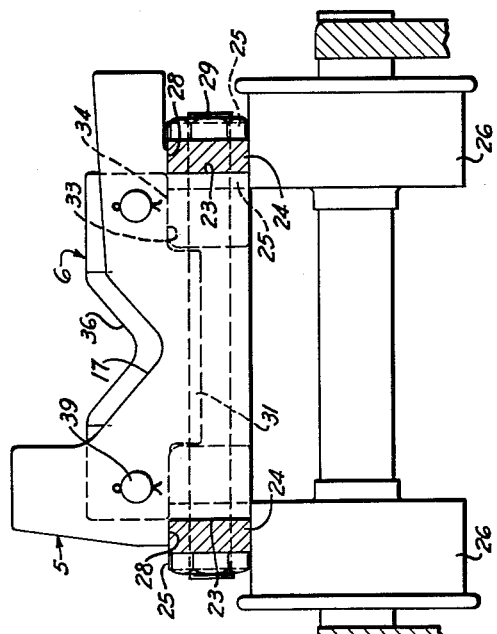
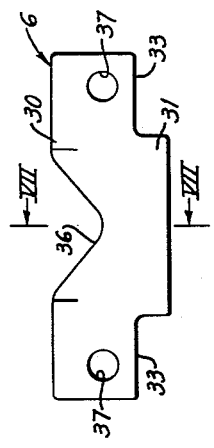
INVENTORS
WALTER A. LINDSTROM
ADOLF O. PREUSS
BY
Donald G. Dalton
THEIR ATTORNEY United States Patent Office 2,715,958
Patented Aug. 23, 1955

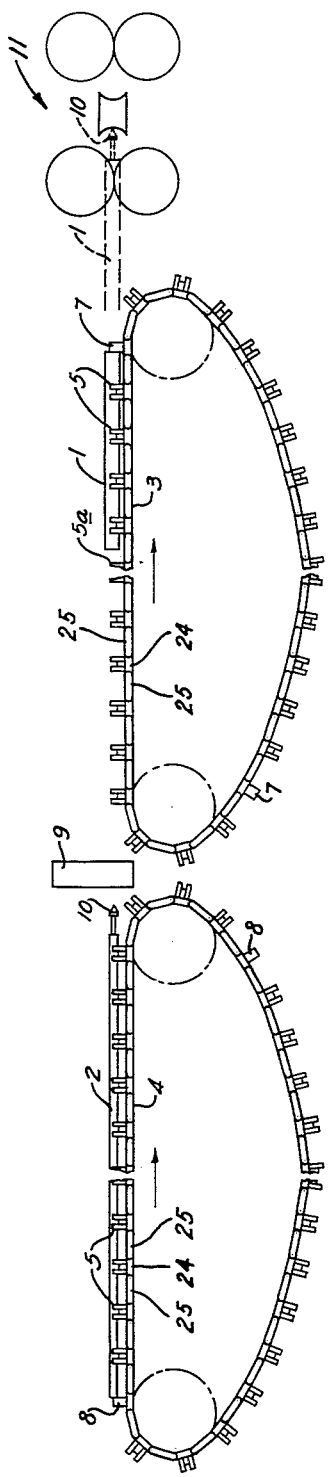
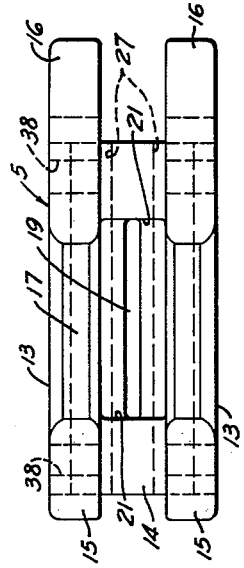
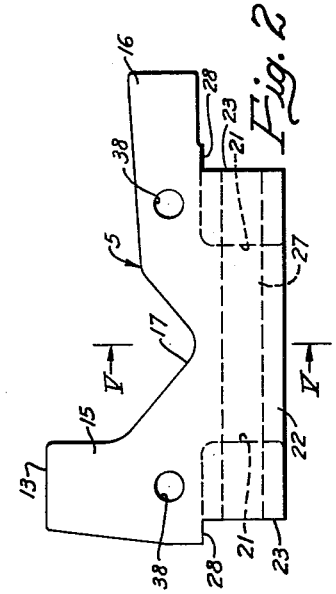
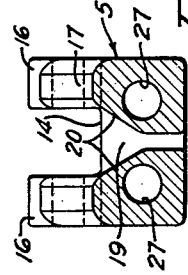

2,715,958

CHAIN CONVEYOR FOR HANDLING PIERCED BILLETS AND MANDREL BARS

Walter A. Lindstrom and Adolf O. Preuss, Gary, Ind., assignors to United States Steel Corporation, a corporation of New Jersey Application February 18, 1954, Serial No. 411,111

8 Claims. (Cl. 198—131)

This invention relates, as indicated, to a chain conveyor for handling pierced billets and mandrel bars, and more particularly, to an improved arrangement of saddle and saddle inserts for supporting the pierced billets and mandrel bars on a chain conveyor during insertion of a mandrel bar in a billet.

This invention is directed to improvements in chain conveyor apparatus of the type in which a mandrel bar is inserted in a pierced billet prior to delivery of the billet to a rolling mill where its wall thickness is reduced and its length increased to produce a seamless tube or pipe. This type of conveyor apparatus comprises a first chain conveyor on which the pierced billet is received and supported and a second chain conveyor which receives the mandrel bar and which is operated to insert the mandrel bar in the pierced billet while it is supported and held against movement on the first chain conveyor. Thereafter, the first chain conveyor is operated to deliver the assembled billet and mandrel bar to the rolling mill.

The two conveyors are provided with supports for receiving and supporting the mandrel bar and pierced billet, and it is necessary that such supports carry the mandrel bar in a position axially aligned with the pierced billet so that its entry in the axially extending billet opening can be effected. The support for the pierced billet is provided by saddles located at spaced intervals along the lengths of the two chain conveyors which are constructed to receive and support the pierced billet in a position in which the mandrel bar may be inserted. The support for the mandrel bar is provided by saddle inserts which are added to selected ones of the saddles to provide elevated supporting surfaces for receiving and supporting the mandrel bar in a position axially aligned with the billet opening.

In accordance with the principles of this invention, an improved arrangement of saddle and saddle insert is provided. The improvements are directed to the end of facilitating the attachment and mounting of the saddles on the conveyor chain and the application of the mandrel bar supporting inserts to the saddles.

Other objects and advantages of the invention will become apparent from the following description.

In the drawings, there is shown a preferred embodiment of the invention. In this showing:

Figure 1 is a diagrammatic view illustrating the type of chain conveyor to which the improvements of this invention are directed;

Figure 2 is a side elevational view of a supporting saddle constructed in accordance with the principles of this invention and used on the chain conveyors shown in Figure 1;

Figure 3 is a plan view of the saddle shown in Figure 2;

Figure 4 is an end elevational view looking from the right of Figure 2;

Figure 5 is a sectional view taken substantially along the line V—V of Figure 2;

Figure 6 is a side elevational view of a mandrel bar supporting insert for the saddle shown in Figure 2;

Figure 7 is a sectional view taken substantially along the line VII—VII of Figure 6;

Figure 8 is a plan view of the insert shown in Figure 6;

Figure 9 is a fragmentary sectional and elevational view illustrating the saddle and saddle insert of Figures 2 and 6 assembled and mounted on a chain conveyor; and Figure 10 is a plan view of the apparatus shown in Figure 9.

In Figure 1 of the drawings, the numeral 1 designates a pierced billet and the numeral 2 designates a mandrel bar to be inserted in the billet 1, the billet 1 being carried on a first chain conveyor 3 and the mandrel bar 2 being carried on a second chain conveyor 4. The billet 1 is received and supported on the chain conveyor 3 by saddles 5 (see Figures 2–5), and the mandrel bar 2 is received and supported on the chain conveyor 4 by saddles 5 having inserts 6 (see Figures 6–8) secured thereto as best shown in Figures 9 and 10. In the operation of the apparatus thus far referred to for the purpose of inserting the mandrel 2 in the billet 1, the chain conveyor 3 is held stationary with the front end of the billet 1 engaged with a stop 7 mounted on the conveyor. The chain conveyor 4 is then operated in the direction indicated by the arrow to engage a pusher 8 with the rear end of the mandrel bar 2 to move it through a lubricator 9 and insert it in the pierced billet 1. The forward movement of the mandrel bar 2 is stopped when its front end 10 projects about eight feet beyond the forward end of the billet 1. After insertion of the mandrel bar 2 in the billet 1, the conveyor 3 is operated in the direction indicated by the arrow to move the assembled billet and mandrel bar forwardly into a multi-stand rolling mill, schematically illustrated and designated as a whole by the numeral 11, where it is rolled on the mandrel bar to reduce its wall thickness and increase its length. After rolling, the mandrel bar with the rolled tube thereon is taken to a stripper apparatus where the mandrel bar is removed from the pipe. Both conveyors are intermittently actuated and have control mechanism for stopping their operation after movement through 180° to position the pushers 8 and stops 7 for a subsequent cycle of operation.

As will be apparent from Figure 1, the conveyor 3 is provided with two stops 7 and the conveyor 4 is provided with two pushers 8, the stops 7 and pushers 8 being spaced 180° apart on their respective conveyors. Each of the stops 7 comprises a saddle 5 having an insert in the form of a plate mounted therein, the insert having a semi-circular opening (not shown) axially aligned with the billet opening the edges of which engage with the billet end but permit movement of the mandrel bar 2 therethrough and guide its forward movement. Each of the pushers 8 similarly comprises a saddle 5 having an insert in the form of a flat plate mounted therein for engagement with the end of the mandrel bar. The saddles 5a on the conveyor 3 which are adjacent the rear of the billet 1 are provided with guide inserts (not shown) which are shaped to guide and center the forward end 10 of the mandrel bar as it moves into the pierced billet.

As best shown in Figure 4, each saddle 5 comprises a body member 12 of U-shape having a pair of spaced parallel and upwardly projecting flanges 13 and a connecting web 14 at the bottom thereof. Each of the flanges 13 has an L-shape in front elevation, as viewed in Figure 2, with its vertical leg 15 providing a stop and the forward end of its horizontal leg 16 providing an extension for a billet or bar supply skids (not shown) which deliver the billets and bars to the conveyors 1. The supply skids deliver the billets and bars laterally onto the upper surfaces of the legs 16 over which they roll to the left as viewed in Figure 2 until their rolling movement is stopped by the vertical legs 15. Adjacent the point of connection of the vertical leg 15 and horizontal leg 16, the flanges 13 are provided with a depression or recess 17, preferably of V-shape as shown in Figure 2, in which a pierced billet is received and centered for the insertion of a mandrel bar 2 after its rolling movement is stopped by the vertical legs 15.

The flanges 13 and web 14 define an upwardly opening space 18 in which an insert 6 may be received and mounted in a manner to be described. The web 14 is provided with a V-shaped opening or socket 19 having sloping side walls 20 which diverge in an upward direction for a purpose to be described, the socket opening 19 being elongated and extending between the lines 21 as shown in Figures 2 and 3.

The spaces 18 between the flanges 13 provide a self-cleaning action with respect to scale which may be deposited on the saddles 5. The pierced billets are, of course, at rolling temperature when delivered to the saddles 5, and surface scale accumulations which may be removed when the billet movement is stopped by the legs 15 fall into the spaces 18 and the space at either side of the saddles.

The base of each saddle 5 comprises a mounting portion 22 which depends from the web 14. This portion 22 has end faces 23 which are spaced apart a distance equal to the transverse spacing of the links forming the chain conveyors 3 and 4. As shown in Figure 1, the conveyor chains 3 and 4 are comprised of alternately arranged short links 24 and long links 25 which are pivoted together at their ends as shown in Figures 9 and 10, and the saddles 5 are mounted transversely of the short links 24. The spacing of the surfaces 23 of the depending portion 22 corresponds to the spacing of the inner surfaces of the short links 24 so that the depending portion 22 of the saddle is effective to maintain the lateral spacing of the chain links which have rolling and supporting engagement on rollers 26 which are positioned at spaced intervals along the conveyors. The depending portion 22 of each saddle has openings 27 which extend transversely of the spaced links 24 of the conveyors. The saddles 5 are mounted on the links 24 by inserting the depending portions 22 into the space between the links 24 with the downwardly facing supporting ledges 28 at opposite ends thereof and positioned outwardly of the surfaces 23 (see Figure 2) engaged with the upper surfaces of the links 24. The links 24 have openings which align with the saddle openings 27, and mounting pins or bolts 29 are inserted through aligned sets of these openings for mounting the saddles in their operative positions.

As best shown in Figures 6 through 8, each of the inserts 6 comprises a body member 30 having a depending portion 31 which is essentially of V-shape in transverse section and has sloping side walls 32 which converge downwardly as shown in Figure 7. The depending portion 31 is in the nature of a tongue which has a length corresponding to the length of the V-shaped saddle opening or socket 19 in which it is received when the insert 6 is mounted in a saddle 5. Opposite ends of each insert 6 have downwardly facing surfaces 33 along the bottom thereof which extend laterally outwardly from the tongue 31 for supporting engagement with supporting surfaces 34 at opposite ends of a saddle socket 19 and on the upper surface of the web 14 as shown in Figure 9. Each insert 6 has a thickness such that it has a snug fit in a saddle opening 18 so that its ends are held securely by the saddle flanges 13 against movement lengthwise of the conveyor chain. The upper surface of each insert 6 is provided with a depression or recess 36 which is positioned above the surface of a saddle recess 16 when it is assembled in a saddle as shown in Figure 9 with its tongue 31 positioned in a saddle socket 19 with surfaces 33 and 34 in supporting engagement with each other. The ends of the inserts 6 have openings 37 which align with similar openings 38 in the ends of the flanges 13 for the reception of locking pins 39 for holding the inserts against movement out of positions mounted in the saddles 5.

The above description and accompanying drawings give a specific disclosure of one form of saddle insert 6 which is designed for the purpose of receiving and supporting mandrel bars on the conveyors. However, it is to be understood that the principles of the invention are applicable to inserts having other configurations for other purposes. As indicated above, the saddle 5a is provided with a guide insert (not shown) for centering and guiding the forward end 10 of the mandrel bar as it is moved into the axially extending opening in a billet 1, and which will be provided with end flanges received between the saddle flanges 13, supporting surfaces 33, and a depending tongue 31 received in a saddle socket 19 as provided on the insert 6. Similarly, the stops 7, described above as plates mounted on saddles 5, are likewise provided with end mounting flanges having supporting surfaces 33 with a tongue 31 therebetween for entry in a saddle socket 19. While various inserts may have different shapes for different purposes, the structure by which they are mounted in the saddle 5 is the same.

From the foregoing, it will be apparent that the U-shaped configuration of the saddle 5 facilitates the attachment thereto of an insert 6. To attach an insert 6 in position, it is only necessary to drop it in the saddle opening 18 and movement of the insert tongue 31 into the saddle socket opening 19 is automatically effective to center the position of the insert, while engagement of the surfaces 33 and 34 is effective to place the mandrel bar supporting surface 36 at the proper elevation above the billet supporting surface 17. Mounting of the insert is of course easily completed by attachment of the pins 39. Attention is also directed to the fact that attachment of the saddles 5 to the chain conveyors can be effected quite easily, it being only necessary to drop a saddle into position between a pair of spaced links 24 with its depending portion 22 positioned between and spacing such links, and with its downwardly facing end surfaces 28 engaged with the upper edges of such links. Application of the fastening bolts 29 completes the attachment and the saddle thereafter provides a rigid brace for the conveyor chain and in fact completes the assembly of the chain conveyor.

Chain conveyors having saddles 5 and saddle inserts as described above are effective for positively handling hot scale producing billets, and provide an apparatus which enables accurate mandrel bar insertion at relatively high speed and rapid delivery of the assembled billet and mandrel bar to a rolling mill.

While one embodiment of our invention has been shown and described it will be apparent that other adaptations and modifications may be made without departing from the scope of the following claims.

We claim:

1. In a chain conveyor for handling pierced billets and mandrel bars, a supporting saddle comprising a U-shaped body having upwardly projecting and spaced parallel flanges extending transversely of the conveyor, said flanges each having a depression intermediate the ends of their upper edges providing a recess for the reception and support of a billet, and an insert removably mounted in the space between said flanges with its ends positioned between said flanges and held thereby against movement lengthwise of the conveyor.

2. The invention defined in claim 1 characterized by said U-shaped body having a web connecting the lower edges of said flanges and on which said insert has supporting engagement.

3. The invention defined in claim 1 characterized by said flanges and insert having sets of aligned openings in their ends with fastening pins received therein to hold said insert against movement out of its mounted position.

4. In a chain conveyor for handling pierced billets and mandrel bars, a saddle comprising a body extending transversely of the conveyor and having billet supporting lugs projecting upwardly from opposite sides thereof, said lugs being parallel and defining a space therebetween extending transversely of the conveyor, and an insert removably mounted in said space and having its upper edge projecting above said lugs.

5. In a chain conveyor for handling pierced billets and mandrel bars including a chain drive formed of pairs of spaced parallel links, a supporting saddle comprising a U-shaped body extending transversely of the space between the links of one of said pairs and having parts at its ends supported on said one pair of links and a depending portion intermediate said parts received in the space between said one pair of links for maintaining the spaced and parallel relation thereof, said one pair of links and depending portion having aligned openings with a connecting pin received therein, said body having upwardly projecting and spaced parallel flanges extending transversely of the conveyor, said flanges each having a depression intermediate the ends of its upper edge providing a recess for the reception and support of a billet, and an insert removably mounted in the space between said flanges with its ends positioned between said flanges and held thereby against movement lengthwise of the conveyor chain and having a center portion of its upper edge projecting above said recesses.

6. The invention defined in claim 5 characterized by said U-shaped body having a web connecting the lower edges of said flanges, said web having a downwardly opening socket formed therein, and said insert having a depending mounting tongue received in said socket.

7. The invention defined in claim 5 characterized by said insert edge center portion providing a guide surface for a mandrel bar moving thereover at a relatively high speed.

8. In a chain conveyor for handling pierced billets and mandrel bars including a chain drive formed of pairs of spaced parallel links, a supporting saddle comprising a U-shaped body extending transversely of the space between the links of one of said pairs and having parts at its ends supported on said one pair of links and a depending portion intermediate said parts received in the space between said one pair of links for maintaining the spaced and parallel relation thereof, said one pair of links and depending portion having aligned openings with a connecting pin received therein, said body having upwardly projecting and spaced parallel flanges extending transversely of the conveyor, said flanges each having a depression intermediate the ends of its upper edge providing a recess for the reception and support of a billet, and an insert removably mounted in the space between said flanges with its ends positioned between said flanges and held thereby against movement lengthwise of the conveyor chain and having a center portion of its upper edge projecting above said recesses, said flanges and insert having sets of aligned openings in their ends respectively extending parallel to said chain links, and a locking pin in each of said sets of openings for holding said insert against movement out of its mounted position.

References Cited in the file of this patent

UNITED STATES PATENTS 1,252,583  Kellum _____ Jan. 8, 1918